United States Patent

Sasaki et al.

Patent Number: 5,556,669
Date of Patent: Sep. 17, 1996

[54] COATING WITH CARBOXYL AND CARBOXYLATE-CONTAINING POLYMER AND HYDROXYL AND EPOXY-CONTAINING POLYMER

[75] Inventors: Shigeyuki Sasaki, Takatsuki; Takeshi Takagi, Yawata; Yoshitaka Okude, Hirakata, all of Japan

[73] Assignee: Nippon Paint Co., Ltd., Osaka, Japan

[21] Appl. No.: 570,568

[22] Filed: Dec. 11, 1995

Related U.S. Application Data

[62] Division of Ser. No. 385,816, Feb. 9, 1995, Pat. No. 5,508,353.

[30] Foreign Application Priority Data

Feb. 9, 1994 [JP] Japan .................................. 6-15152

[51] Int. Cl.$^6$ .................................................. B05D 3/02
[52] U.S. Cl. ..................... 427/410; 427/386; 427/407.1
[58] Field of Search ................................ 525/207, 208; 427/386, 407.1, 410

[56] References Cited

U.S. PATENT DOCUMENTS

| | | | |
|---|---|---|---|
| 4,680,361 | 7/1987 | Koleske et al. | 525/329.5 |
| 5,270,392 | 12/1993 | Okude et al. | 525/207 |
| 5,367,027 | 11/1994 | Fushimi et al. | 525/207 |

FOREIGN PATENT DOCUMENTS

| | | |
|---|---|---|
| 581517 | 7/1993 | European Pat. Off. . |
| 2255350 | 12/1974 | France . |

*Primary Examiner*—Robert E. Sellers
*Attorney, Agent, or Firm*—Townsend & Banta

[57] ABSTRACT

The present invention provides a curable resin composition which provides cured film having not only excellent acid resistance but also good weather resistance, good mar resistance and seal cracking resistance because of its high extensibility. The curable resin composition comprises (a) 20 to 80% by weight of a polymer having carboxyl and carboxylate groups; and (b) 2% to 80% by weight of a polymer having hydroxyl and epoxy groups. The present invention also provides a process for forming a cured film using the resin composition.

3 Claims, No Drawings

COATING WITH CARBOXYL AND CARBOXYLATE-CONTAINING POLYMER AND HYDROXYL AND EPOXY-CONTAINING POLYMER

CROSS REFERENCE TO A RELATED APPLICATION

This is a divisional application of application Ser. No. 08/385,816 filed Feb. 9, 1995, now U.S. Pat. No. 5,508,352.

FIELD OF THE INVENTION

The present invention relates to a curable resin composition which is suitable for an automotive top coating composition or a coil coating composition, and to a process for forming a cured film on a substrate using the coating composition.

BACKGROUND OF THE INVENTION

A coating composition for top coating an automobile generally contains, as a film forming binder, a combination of a hydroxyl group-containing polymer and a melamine curing agent. The cured film obtained from the melamine curing system. However, has poor acid resistance and is damaged by acid rain which has recently become a serious problem. The damage of the film provides poor appearance.

In order to overcome the above mentioned defects, the present inventors have proposed novel coating compositions without employing the melamine curing agent disclosed in Japanese Kokai Publications 45577/1990, 287650/1991. Similar coating compositions are also disclosed in U.S. Pat. No. 2,977,334 (to Zopf et al.), U.S. Pat. No. 3,399,109 (to Zimmerman et al.) and U.S. Pat. No. 3,528,935 (to Marlon et al.). The proposed coating compositions cure by means of a reaction of acid with epoxy and therefore have good acid resistance and sufficient weather resistance for an automotive top coating application.

However, these coatings have a problem in that they are easily brushed by a car washing machine, because of their poor mar resistance. If the degree of crosslinking is raised in order to impart good mar resistance at the mechanical car wash in this curing system, the resulting cured film has poor extensibility and is stiff and brittle. The stiff and brittle film brings another problem in that it easily cracks, particularly when it is formed on a sealer, because such a film hardly responds to expansion and contraction of the sealer. It is therefore difficult to use the proposed coating compositions as a top coating composition for automobiles. It is desired to develop top coating composition which has not only excellent acid resistance but also excellent mar resistance and what we call "sealer cracking resistance".

SUMMARY OF THE INVENTION

The present invention provides a curable resin composition which provides cured film having not only excellent acid resistance but also good weather resistance, good mar resistance and sealer cracking resistance because of its high extensibility.

The present invention thus provides a curable resin composition comprising:

(a) 20 to 80% by weight of a polymer having carboxyl and carboxylate groups prepared by half-esterifying (1) a polymer having carboxyl and anhydride groups prepared by copolymerizing (i) 5 to 90% by weight of a carboxyl group-containing ethylenically unsaturated monomer prepared by half-esterifying a hydroxyl group-containing ethylenically unsaturated monomer with an anhydride group-containing compound in an molar ratio of the hydroxyl group to the anhydrlde group of $1/1.0$ to $1/0.5$, (ii) 10 to 40% by weight of an arthydride group-containing ethylenically unsaturated monomer and (iii) 0 to 85% by weight of a copolymerizable ethylenically unsaturated monomer which is different from (i) and (ii), with (2) a monoalcohol having 1 to 12 carbon atoms; and (b) 20 to 80% by weight of a polymer having hydroxyl and epoxy groups prepared by copolymerizing (1) 5 to 60% by weight of a hydroxyl group-containing ethylenically unsaturated monomer, (2) 10 to 60% by weight of an epoxy group-containing ethylenically unsaturated monomer and (3) 0 to 85% by weight of a copolymerizable ethylenically unsaturated monomer which is different from (1) and (2).

The present invention also provides a process for forming a cured film on a substrate comprising:

priming or intercoating the substrate;

applying a water-borne or solvent-borne color base paint to a primed or intercoated surface of the substrate;

applying a clear coating composition to a base coated surface of the substrate without curing a base coating layer; and baking both the base coating layer and the clear coating layer to cure:

an improvement being present in that the clear coating composition comprises the curable resin composition described above.

DETAILED DESCRIPTION OF THE INVENTION

The polymer having carboxyl and carboxylate groups (a) employed in the curable resin composition of the present invention is a copolymer of at least two ethylenically unsaturated monomers (Hereinafter, the wording "monomer" means "ethylenically unsaturated monomer".).

The first monomer is a carboxyl group-containing monomer (a)(1)(i), which is prepared by reacting a hydroxyl group-containing monomer with an anhydride group-containing compound in an molar ratio of the hydroxyl group to the anhydride group of $1/1.0$ to $1/0.5$, preferably $1/1.0$ to $1/0.8$. Such an esterification reaction is called by those skilled in the art as "half-esterification reaction".

If the molar ratio of hydroxyl group to anhydride group is higher than $1/0.5$, viscosity of the resulting polymer becomes too high and workability of the resulting curable resin composition becomes poor. If the ratio is lower than $1/1.0$, storage stability of the resulting curable resin composition becomes poor.

It is preferred that the hydroxyl group-containing monomer has 6 to 23, particularly 6 to 13 carbon atoms. If the monomer has less than 6 carbon atoms, flexibility of the cross-linked site becomes poor and too hard cured film may be formed. If the monomer has more than 23 carbon atoms, degree of crosslinking of the polymers becomes too coarse, and the physical strength of the resulting coating becomes poor.

Specific examples of the the hydroxyl group-containing monomer include 2-hydroxypropyl (meth)acrylate, 4-hydroxybutyl (meth)acrylate, 6-hydroxyhexyl (meth)acrylate, and ε-caprolactone and oxides reactants thereof. These compounds are commercially available. For example, 4-hydroxybutyl acrylate is available as a trade name of "4HBA" from Mitsubishi Kasei K. K. The ε-caprolactone reactants are commercially available from Daicel Chemical Industries, Ltd as a trade name of "Placcel FM-1", "Placcel FM-2", "Placcel FA-1" and "Placcel FA-2". The propylene oxide reactants are available as a trade name of "Blemmer PP-1000" and "Blemmer PP-800", and the ethylene oxide reactants are available as a trade name of "Blemmer PE-90" from Nippon Yushi K. K. These compounds may otherwise be prepared by esterifying of (meth)acrylic acid with large excess amount of diols such as, for example, 1,4-hexane diol and 1,6-hexane diol.

The anhydride group-containing compound employed in the present invention may be any compound which provides a carboxyl functionality by half-esterifying with a hydroxyl group under usual reaction conditions such as temperatures between room temperature and 150° C., and normal pressures. The anhydride group-containing compound has preferably 8 to 12, more preferably 8 to 10 carbon atoms and preferably has saturated or unsaturated cyclic group, because such a compound may impart improved compatibility to tile resulting polymer. Specific examples of the preferred arthydride group-containing compound include hexahydrophthalic anhydride, phthalic anhydride, 4-methylhexahydrophthalic anhydride, tetrahydrophthalic anhydride and trimellitic anhydride.

The half-esterification reaction is carried out according to any process known to the art, for example, at a Temperature of from room temperature to 150° C.

As the second monomer, the anhydride group-containing monomer (a)(1)(ii) may be used. The monomer may be anyone which provides carboxyl functionality by half-esterifying with hydroxyl group under usual reaction condition such as temperature between room temperature and 150° C. and normal pressures. Preferred examples of the anhydrlde group-containing monomer include itaconic anhydride, maleic arthydride and citraconic anhydride.

A copolymerizable monomer (a)(1)(iii) which is different from (a)(1)(i) and (a)(1)(ii) may optionally be employed for preparing the polymer having carboxyl and carboxylate groups (a). Preferred monomer (a)(1)(iii) has one ethylenically unsaturation and 2 to 15. particularly 3 to 12 carbon atoms.

More than two monomers may also be used in combination for preparing the polymer (a) in order to improve compatibility with the other polymers. Specific examples of the monomer include styrene, α-methylstyrene, (meth)acrylates (e.g., methyl (meth)acrylate, ethyl (meth)acrylate, propyl (meth)acrylate. n-, i- and t-butyl (meth)acrylate, 2-ethylhexyl (meth)acrylate, lauryl (meth)acrylate and cyclohexyl (meth)acrylate and the like), "Veova-9" and "Veova-10" available from Shell Chemical Co.

The carboxyl group-containing monomer (a)(1)(i), the anhydride group-containing monomer (a)(1)(ii) and the copolymerizable monomer (a)(1)(iii) of the present invention may be polymerized by the usual solution polymerization procedure to prepare the polymer having carboxyl and anhydride groups (a)(1) of the present invention. The preferred condition for polymerization is 3 to 8 hours of reaction time at a temperature of 100° to 150° C. by the use of an azoic or peroxidic radical polymerization initiator. The radical polymerization initiator can be used in an amount of 3 to 15% by weight based on the total monomer weight. In the polymerization, an additive, such as chain transfer agent may be employed.

Copolymerization ratio of the monomer (a)(1)(i), the monomer (a)(1)(ii) and the monomer (a)(1)(iii) is, generally 5 to 90%, preferably 10 to 60% by weight/generally 10 to 40%, preferably 10 to 30% by weight/generally 0 to 85%, preferably 10 to 80% by weight. If an amount of the monomer (a)(1)(i) is less than 5% by weight, mar resistance of the resulting cured film becomes poor. If the amount is more than 90% by weight, curability of the resulting resin composition becomes poor. If an amount of the monomer (a)(ii) is less than 10% by weight, curability of the resulting resin composition becomes poor. If the amount is more than 40% by weight, storage stability of the resulting curable resin composition becomes poor.

The polymer (a)(1) of the present invention preferably has a number average molecular weight between 500 to 20000, preferably 1000 to 15000, more preferably 1500 to 14000. If the molecular weight is less than 500, the functionality per molecule decreases and the resulting resin composition may have insufficient curability. If the molecular weight is more than 20000, viscosity of the resulting polymer increases, and solid content of the resulting coating composition becomes low.

The molecular weight of the polymer employed in the present invention is a number average molecular weight (Mn), which is determined by GPC method.

The polymer preferably has an acid value between 50 to 600 mgKOH/g, more preferably 100 to 500 mgKOH/g based on solid content. If the acid value is less than 50 mgKOH/g, curability of the resulting resin composition becomes poor. If the acid value is more than 600 mgKOH/g, an acid group remain unreacted, and a water resistance of the resulting cured film becomes poor.

The resulting polymer (a)(1) is then reacted with the monoalcohol in an molar ratio of the anhydride group to the hydroxyl group of 1/1.5 to 1/1, preferably 1/1.5 to 1/1.3 to prepare the polymer having carboxyl and carboxylate groups (a). If the molar ratio is less than 1/1.5, excessive alcohol may generate poppings in the cured film. If the molar ratio is more than 1/1, storage stability of the coating composition becomes poor due to unreacted anhydride groups.

The polymer (a) preferably has an acid value between 25 to 300 mgKOH/g, more preferably 50 to 250 mgKOH/g based on solid content. If the acid value is less than 25 mgKOH/g, curability of the resulting resin composition becomes poor. If the acid value is more than 300 mmKOH/g, storage stability of the resulting resin composition becomes poor.

The monoalcohol (a)(2) employed in the present invention has 1 to 12, preferably 1 to 8 carbon atoms. Upon heating such an alcohol easily volatile, and conveniently regenerates an anhydride group. Typical examples of the monoalcohol include methanol, ethanol, n-propanol, i-propanol, n-butanol, i-butanol, t-butanol, ethylene glycol monomethyl ether, ethylene glycol monoethyl ether, dlmethylamino ethanol, diethylamlno ethanol, acetol, allyl alcohol and propargyl alcohol. Preferred are acetol, allyl alcohol, propargyl alcohol and methanol and ethanol.

The polymer having hydroxyl and epoxy groups (b) employed in the curable resin composition of the present invention preferably has an average of 2 to 10, more preferably a average of 3 to 8 epoxy groups, and an average of 2 to 12, preferably an average of 4 to 10 hydroxyl groups. It is preferred that the polymer (b) has an epoxy equivalent of 100 to 800, particularly 200 to 700, and a hydroxyl value of 200 to 1300, particularly 300 to 1200.

If the epoxy equivalent is more than 800, the resulting coating composition may have poor curability. If the epoxy equivalent is less than 100, the cured film may become hard and brittle. If the hydroxyl value is less than 200, water resistance of the cured film becomes poor. If the hydroxyl value is more than 1300, the resulting coating composition may have poor curability.

The polymer having hydroxyl and epoxy groups (b) is prepared by copolymerizing, 5 to 60%, preferably 15 to 30% by weight of the hydroxyl group-containing monomer (b)(1), 10 to 60%, preferably 15 to 50% by weight of the epoxy group-containing monomer (b)(2) and optionally 0 to 85%, preferably 10 to 60% by weight of the copolymerizable monomer (b)(3) which is different from (b)(1) and (b)(2).

If the amount of the monomer (b)(1) is less than 5% by weight, curability of the resulting coating composition becomes poor. If the amount is more than 60% by weight, storage stability of the resulting resin composition becomes poor. If the amount of the monomer (b)(2) is less than 10% by weight, curability of the resulting coating composition becomes poor. If the amount is more than 60% by weight, a hard and brittle cured film having poor weather resistance may be provided.

The polymerization may be conducted by methods known to the art, for example, radical solution polymerization. The polymer having hydroxyl and epoxy groups (b) has a number average molecular weight of 500 to 20000, more preferably 1000 to 10000.

If the number average molecular weight is less than 500, curability of the resulting resin composition becomes poor, and is more than 20000, storage stability of the composition becomes poor.

Typical examples of the hydroxyl group-containing monomer (b)(1) include those described above as "the hydroxyl group-containing monomer" used for preparing the carboxyl group-containing monomer (a)(1)(i), such as 2-hydroxyethyl (meth)acrylate, 4-hydroxybutyl (meth)acrylate and Placcel FM-1 (a ring-open adduct of ε-caprolactone and 2-hydroxyethyl methacrylate available from Daicel Chemical Industries, Ltd.). Typical examples of the monomer (b)(2) include glycidyl (meth)acrylate and 3,4-cpoxycyclohexyl (meth)acrylate. Typical examples of the monomer (b)(3) include the copolymerizable monomer (a)(1)(iii) described above.

The curable resin composition of the present invention is prepared by mixing the polymer having carboxyl and carboxylate groups (a) and the polymer having hydroxyl and epoxy groups (b).

The composition may be made in such an amount that a molar ratio of acid group in the polymer (a) to epoxy group in the polymer (b) is within the range of $1/1.2$ to $1/0.6$, preferably $1/1.0$ to $1/0.8$, as well as a molar ratio of carboxylate group in the polymer (a) to hydroxyl group in the polymer (b) is within the range of $1/1.5$ to $1/0.5$, preferably $1/1.4$ to $1/0.8$.

If the molar ratio of acid group to epoxy group is more than $1/0.8$, curability of the resulting resin composition becomes poor. If the ratio is less than $1/1.2$, the cured film becomes yellow. If the molar ratio of carboxylate group to hydroxyl group is more than $1/0.5$, curability of the resulting resin composition becomes poor. If the ratio is less than $1/1.5$, the water resistance on the resulting cured film becomes poor due to the presence of excess hydroxyl groups.

The above mentioned molar ratios can be specifically calculated by the methods known to the art from hydroxyl value, acid value and epoxy equivalent of the employed polymers. It is preferred that the curable resin composition of the present invention contains 20 to 80%, preferably 30 to 70% by weight of the polymer (a), 20 to 80%, preferably 30 to 70% by weight of the polymer (b). If the amount of polymer (a) is more than 80% by weight, the resulting cured film becomes too soft and acid resistance of the Film becomes poor. If the amount Is less than 20% by weight, mar resistance of the resulting cured film becomes poor.

According to the curable resin composition of the present invention, a carboxyl group and a carboxylate group in the polymer (a) are ring-closed upon heating to form an anhydride group and a free monoalcohol. The monoalcohol evaporates to leave the system. The anhydrlde group then reacts with a hydroxyl group present in the polymer (b) to form a crosslinked site to regenerate an acid group. The generated acid group in the polymer (a) and an acid group originally present in the polymer (a) reacts with an epoxy group present in the polymer (b) to form another crosslinked site. As a result, the two polymers (a) and (b) are crosslinked together and proceed curing.

In the present composition, high crosslinking density is provided to the resulting cured film, and it is believed that, since the carboxyl group in the polymer (a) derived from the monomer (a)(1)(i) is relatively apart from its polymer backbone, the region which is adjacent to crosslinking has a high degree of freedom of motion, the cured film has high extensibility, and it exhibits excellent mar resistance and excellent sealer cracking resistance.

The curable resin composition of the present invention may further contain a curing catalyst for promoting the reaction between acid and epoxy. Typical examples of the curing catalysts are quaternary ammonium salts, such as benzyltriethylammonium chloride or benzyltriethylammonium bromide, tetrabutylammonium chloride or tetrabutylammonium bromide, tetrabutylammonium salicylate or tetrabutylammonium glycolate; sulfonates, such as p-toluenesulfonate; and the like.

Combinations of some different curing catalysts may be employed in the present resin composition. Examples of the curing catalyst include those usually employed for an esterification-reaction of an acid with an epoxide such as a tertiary ammonium salt. The curing catalyst may be combined with tin catalysts which are art-known (see Japanese Kokai Publications 151651/1990 and 279713/1990). Examples of the tin catalysts are dimethyltin bis(methyl maleate), dimethyltin bis(ethyl maleate), dimethyltin bis(butyl maleate) dibutyltin bis(butyl maleate), dibutyltin bis(dodecyl benzene sulfonate) and the like. Amounts on the curing catalyst and tin catalystiemployed is within the range of 0.1 to 3.0% by weight.

The resin composition may also contain melamine-formaldehyde resin and/or blocked isocyanate, in order to enhance crosslinking density and water resistance. Further, a UV absorber, a hindered amine light stabilizer and anti oxidizing agent may be added to enhance weather resistance. The composition may also contain other additives, such as rheology controlling agent (e.g. crosslinked resin particles), surface controlling agent. In order to adjust viscosity of the resin composition, a diluent (e.g. alcohols such as methanol, ethanol, propanol and butanol; hydrocarbon; esters) may be added thereto.

The resin composition has carboxyl groups which are neutralized with amine to make the composition water-dispersible or water-soluble. The resin composition may be formed into an aqueous resin composition.

The curable resin composition of the present invention is suitably used for a clear coating composition. The clear coating composition is generally applied on a base coating layer formed from a base coating composition which is either aqueous or solvent-borne and contains color pigment. It is also preferred that the clear coating composition is applied on the base coating layer without curing the base coating layer and then the composite layer is baked to cure (two-coat one-bake curing system).

In the case where the aqueous base coating composition is employed in the two-coat one-bake system, the base coating layer, if necessary, is heated at 60° to 100° C. for 2 to 10 minutes before coating the clear coating composition. The base coating composition is generally explained in U.S. Pat. Nos. 5,151,125 and 5,183,504 which are herein incorporated. Especially, the aqueous coating composition disclosed in U.S. Pat. No. 5,183,504 is suitable in view of finish appearance and film performance.

The curable resin composition may be prepared by art-known methods, for example as enamel paint mixing ingredients by kneader or roll.

The resin composition may be applied on a substrate by spraying, brushing, dipping, roll coating, flow coating and the like. The substrate can be any one, including wood, metal, glass, fabric, plastics, plastic foam and the like. Preferred are plastics, metals (e.g. steel and aluminum) and alloys thereof. The substrate may be primed or intercoated by art-known methods if necessary.

The coated coating layer is generally cured by heating at a temperature of 100° to 180° C., preferably 120° to 160° C. Curing time may be varied by curing temperature, but generally for 10 to 30 minutes at a temperature of 120° to 160° C.

The film thickness of the resulting coating layer may be varied depending upon its usage, but in many cases within the range of 0.5 to 3 mil.

EXAMPLES

The present invention is illustrated by the following Examples which, however, are not to be construed as limiting the present invention to their details. The amounts described herein means "parts by weight", unless otherwise indicated.

Preparative Examples 1 to 22

Preparative Examples 1 to 22 illustrate a preparation of the polymers having carboxyl and carboxylate groups (a) employed in the curable resin composition of the present invention.

Preparative Examples 1 to 7 illustrate a preparation of the carboxyl group-containing monomer (a)(1)(i) which is a precursor of the polymer (a).

Preparative Example 1

A reaction vessel equipped with a thermometer, a stirrer, a cooling tube, a nitrogen inlet tube and a dropping funnel was charged with 310 parts of Arco Solve PMA (An organic solvent available from Kyowa Yuka K. K.), 600 parts of 4-hydroxybutyl acrylate, 642 parts of hexahydrophthalic anhydride and 0.48 parts of hydroquinone monomethyl ether. A temperature of the content was raised to 145° C. and held over 20 minutes. The reaction mixture was then cooled and evacuated from the vessel to provide the carboxyl group-containing monomer A-i.

Preparative Examples 2 to 7

The carboxyl group-containing monomer A-ii to A-vii were prepared according to the procedure described for preparative example 1, except using the compositions tabulated in the following Table 1.

TABLE 1

| No. of prep. example | 1 | 2 | 3 | 4 |
|---|---|---|---|---|
| No. of obtained monomer (a)(1)(i) | A-i | A-ii | A-iii | A-iv |
| Arco Solve PMA | 310 | 360 | 320 | 250 |
| Hydroxyalkyl acrylate | 4HBA[1] 600 | 4HBA 600 | 4HBA 600 | FA1[5] 600 |
| Anhydride containing compound | HHPA[2] 642 | 4MHHPA[3] 840 | PhAn[4] 679 | HHPA 402 |
| Hydroquinone monomethyl ether | 0.48 | 0.47 | 0.48 | 0.45 |

| No. of prep. example | 5 | 6 | 7 |
|---|---|---|---|
| No. of obtained monomer (a)(1)(i) | A-v | A-vi | A-vii |
| Arco solve PMA | 211 | 295 | 279 |
| Hydroxyalkyl acrylate | PP1000[6] 600 | HEMA[7] 600 | HEA[8] 600 |
| Anhydride containing compound | HHPA 244 | HHPA 580 | HHPA 517 |
| Hydroquinone monomethyl ether | 0.30 | 0.46 | 0.46 |

[1] 4-Hydroxybutyl acrylate
[2] Hexahydrophthalic anhydride
[3] 4-Methylhexahydrophthalic anhydride
[4] Phthalic anhydride
[5] "Placcel FM-1" (e-caprolactone acrylate available from Daicel Chemical Industries, Ltd.)
[6] "Blemmer PP-1000" (polypropylene oxide methacrylate available from Nippon Yushi K.K.)
[7] Hydroxyethyl methacrylate
[8] Hydroxyethyl acrylate Preparative examples 8 to 14 illustrate a preparation of the polymers having carboxyl and anhydride groups (a)(1) which is a precursor of the polymer (a).

Preparative Example 8

A reaction vessel equipped with a thermometer, a stirrer, a cooling tube, a nitrogen inlet tube and a dropping funnel was charged with 150 parts of xylene, 110 parts of "Solvesso 100" (An aromatic hydrocarbon solvent available from Esso K. K.) and 180 parts of propylene glycol monomethyl ether acetate, and a temperature of the content was raised to 130° C. To the reaction vessel was dropwise added over 3 hours a solution of monomer and initiator consisting of 300 parts of styrene. 20 parts of 2-ethylhexyl acrylate, 80 parts of 2-ethylhexyl methacrylate, 440 parts of the carboxyl group-containing monomer A-i prepared in preparative example 1, 250 parts of maleic anhydride, 300 parts of propylene glycol monomethyl ether acetate and 100 parts of t-butylperoxy-2-ethyl hexanoate. The content was stirred for 2 hours to provide a solution containing the polymer having carboxyl and anhydride groups A-I' having a solid content of 54%. A number average molecular weight of the polymer A-I' was 2800.

Preparative Examples 9 to 14

The polymers having carboxyl and anhydride groups A-II' to A-VII' were prepared according to the procedure described for preparative example 8, except using the compositions tabulated in the following Table 2. Properties of the resulting polymers are also indicated below.

TABLE 2

| No. of prep. example | 8 | 9 | 10 | 11 |
|---|---|---|---|---|
| No. of obtained polymer (a)(1) | A-I' | A-II' | A-III' | A-IV' |
| S100[1] | 110 | 360 | 40 | 220 |
| Xylene | 150 | 200 | 150 | 120 |
| PGMEA[2] | 180 | 80 | 250 | 180 |
| Stylene | 300 | 100 | 300 | 300 |
| 2-Ethylhexyl acrylate | 20 | — | — | 250 |
| 2-Ethylhexyl methacrylate | 80 | — | — | 90 |
| Cyclohexyl acrylate | — | — | — | — |
| Butyl methacrylate | — | 95 | — | — |
| Isobutyl acrylate | — | — | 100 | — |
| Isobutyl methacrylate | — | — | 50 | — |
| Ethyl acrylate | — | — | — | — |
| Ethyl methacrylate | — | — | — | — |
| Maleic anhydride | 250 | — | 400 | 170 |
| Itaconic anhydride | — | 100 | — | — |
| PGMEA | 300 | 200 | 400 | 300 |
| Monomer A-i | 440 | — | — | — |
| Monomer A-ii | — | 882 | — | — |
| Monomer A-iii | — | — | 188 | — |
| Monomer A-iv | — | — | — | 240 |
| Monomer A-v | — | — | — | — |
| Monomer A-vi | — | — | — | — |
| Monomer A-vii | — | — | — | — |
| t-BP-2-EH[3] | 100 | 200 | 20 | 100 |
| Solid content (%) | 54 | 50 | 49 | 53 |
| Mn[4] | 2800 | 1500 | 13400 | 3500 |
| Acid value (mgKOH/g) | 315 | 257 | 487 | 223 |

| No. of prep. example | 12 | 13 | 14 | 25 |
|---|---|---|---|---|
| No. of obtained polymer (a)(1) | A-V' | A-VI' | A-VII' | A-VIII' |
| Solvesso 100[1] | 240 | 110 | 110 | 110 |
| Xylene | 220 | 150 | 150 | 150 |
| PGMEA[2] | 180 | 180 | 180 | 180 |
| Styrene | 300 | 300 | 250 | 300 |
| 2-Ethylhexyl acrylate | 140 | — | — | 100 |
| 2-Ethylhexyl methacrylate | 123 | — | — | 300 |
| Cyclohexyl acrylate | — | — | 87 | — |
| Butyl methacrylate | — | — | — | — |
| Isobutyl acrylate | — | — | — | — |
| Isobutyl methacrylate | — | — | — | — |
| Ethyl acrylate | — | 50 | — | — |
| Ethyl methacrylate | — | 90 | — | — |
| Maleic anhydride | 170 | — | — | 300 |
| Itaconic anhydride | — | 250 | 250 | — |
| PGMEA | 300 | 400 | 400 | 300 |
| Monomer A-i | — | — | — | — |
| Monomer A-ii | — | — | — | — |
| Monomer A-iii | — | — | — | — |
| Monomer A-iv | — | — | — | — |
| Monomer A-v | 340 | — | — | — |
| Monomer A-vi | — | 362 | — | — |
| Monomer A-vii | — | — | 517 | — |
| t-BP-2-EH[3] | 80 | 80 | 50 | 100 |
| Solid content | 53 | 53 | 51 | 57 |
| Mn[4] | 4000 | 4000 | 7000 | 3000 |
| Acid value (mgKOH/g) | 223 | 343 | 372 | 343 |

[1] Aromatic hydrocarbon solvent available from Esso K.K..

TABLE 2-continued

[2] Propylene glycol monomethyl ether acetate
[3] t-Butyl peroxy-2-ethylhexyl hexanoate
[4] Number average molecular weight Preparative examples 15 to 21 illustrate a preparation of the polymer (a).

Preparative Example 15

A reaction vessel equipped with a thermometer, a stirrer, a cooling tube, a nitrogen inlet tube and a dropping funnel was charged with 193 parts of the polymer A-I' prepared in preparative example 8 and 12 parts of methanol. A temperature of the content was raised to 60° C. and stirred over 36 hours for reacting. When an absorption due to an anhydride group (1785 cm$^{-1}$) was disappeared under analysis of infrared absorption spectra the reaction mixture was cooled and evacuated from the vessel to provide the polymer having carboxyl and carboxylate groups A-I.

Preparative Examples 16 to 21

The polymers having carboxyl and carboxylate groups A-II to A-VII were prepared according to the procedure described for preparative example 15, except using the compositions tabulated in the following Table 3. Properties of the resulting polymers are also indicated below.

TABLE 3

| No. of prep. example | 15 | 16 | 17 | 18 |
|---|---|---|---|---|
| No. of obtained polymer (a) | A-I | A-II | A-III | A-IV |
| Polymer A-I' | 193 | — | — | — |
| Polymer A-II' | — | 222 | — | — |
| Polymer A-III' | — | — | 208 | — |
| Polymer A-IV' | — | — | — | 197 |
| Polymer A-V' | — | — | — | — |
| Polymer A-VI' | — | — | — | — |
| Polymer A-VII' | — | — | — | — |
| Polymer A-VIII' | — | — | — | — |
| Methanol | 12 | — | — | 8 |
| Ethanol | — | 6 | — | — |
| Propargyl alcohol | — | — | 30 | — |
| Acetol | — | — | — | — |

| No. of prep. example (a) | 19 | 20 | 21 | 26 |
|---|---|---|---|---|
| No. of obtained polymer (a) | A-V | A-VI | A-VII | A-VIII |
| Polymer A-I' | — | — | — | — |
| Polymer A-II' | — | — | — | — |
| Polymer A-III' | — | — | — | — |
| Polymer A-IV' | — | — | — | — |
| Polymer A-V' | 194 | — | — | — |
| Polymer A-VI' | — | 197 | — | — |
| Polymer A-VII' | — | — | 199 | — |
| Polymer A-VIII' | — | — | — | 184 |
| Methanol | 8 | — | — | 12 |
| Ethanol | — | — | 12 | — |
| Propargyl alcohol | — | — | — | — |
| Acetol | — | 28 | — | — |

Preparative Examples 22 to 24

Preparative Examples 22 to 24 illustrate a preparation of the polymers having hydroxyl and epoxy groups employed in the curable resin composition of the present invention.

Preparative Example 22

A reaction vessel equipped with a thermometer, a stirrer, a cooling tube, a nitrogen inlet tube and a dropping funnel, was charged with 330 parts of xylene, 100 parts of Solvesso 100 and 50 parts of propylene glycol monomethyl ether acetate and heated to 130° C.

To the reaction vessel was dropwise added over three hours a solution of monomer and initiator consisting of 230 parts of Veova-9, 215 parts of glycidyl methacrylate, 222 parts of 4-hydroxybutyl acrylate, 330 parts of butyl acrylate, and 40 parts of t-butylperoxy-2-ethyl hexanoate. The content was kept at 130° C. for 30 minutes, to which a mixture consisting of 5 parts of t-butylperoxy-2-ethyl hexanoate and 50 parts of xylene was added dropwise over 30 minutes. The reaction was continued at 130° C. for 2 hours to obtain a colorless transparent varnish solution comprising the polymer having hydroxyl and epoxy groups B-I having a solid content of 65%. The polymer B-I had a number average molecular weight of 6000, a hydroxy equivalent weight of 650 and an epoxy equivalent weight of 660.

Preparative Examples 23 and 24

The polymers having hydroxyl and epoxy groups B-II and B-III were prepared according to the procedure described for preparative example 22, except using the compositions tabulated in the following Table 4. Properties of the resulting polymers are also indicated below.

TABLE 4

| No. of prep. example | 22 | 23 | 24 |
|---|---|---|---|
| No. of obtained polymer (b) | B-I | B-II | B-III |
| Solvent | | | |
| Xylene | 380 | 380 | 150 |
| Solvesso 100[1)] | 100 | — | 430 |
| PGMEA[2)] | 50 | 150 | — |
| Veova-9[3)] | 230 | 300 | — |
| Styrene | — | — | 250 |
| Glycidyl methacrylate | 215 | 355 | 510 |
| 4-Hydroxybutyl methacrylate | 222 | 312 | 120 |
| Cyclohexyl acrylate | — | 100 | — |
| Butyl methacrylate | 330 | — | — |
| Lauryl methacrylate | — | — | 130 |
| t-BP-2-EH[4)] | 45 | 30 | 110 |
| Epoxy equivalent weight (g solid) | 660 | 400 | 280 |
| Hydroxy equivalent weight (g solid) | 650 | 460 | 1170 |
| Mn[5)] | 6000 | 8600 | 1400 |

[1)]Aromatic hydrocarbon solvent available from Esso K.K.
[2)]Propylene glycol monomethyl ether acetate
[3)]Vinyl branched hydrocarbonate available from Shell Chemical Co.
[4)]t-Butylperoxy-2-ethyl hexanoate
[5)]Number average molecular weight

Preparative Examples 25 and 26

Preparative examples 25 and 26 illustrate a preparation of polymers (a main component) for a coating composition of comparative example.

Preparative Example 25

The anhydride group-containing polymer A-VIII' was prepared according to the procedure described for preparative example 8. except using the compositions tabulated in Table 2.

Preparative Example 26

The polymer having carboxyl and carboxylate groups A-VIII was prepared according to the procedure described for preparative example 15, except using the compositions tabulated in Table 3.

Examples 1 to 10

Examples 1 to 10 illustrate coating compositions containing the polymers which were prepared in preparative examples 1 to 24.

Example 1

A curable resin composition was prepared by mixing the following ingredients:

| Ingredients | Amount |
|---|---|
| Polymer A-I (PEx. 15) | 205 |
| Polymer B-I (PEx. 22) | 320 |
| Tetrabutylammonium bromide | 2.2 |
| Tinubin-900 | 6.4 |
| Sanol LS-292 | 3.2 |
| Summary | 536.8 |

The resulting resin composition was diluted with a solvent mixture of butyl acetate and xylene (1/1) to a coatable viscosity to obtain a clear coating composition. A phosphated steel panel was coated with Power Top U-30 (Electrodeposition paint available from Nippon Paint Co., Ltd.) and Orga P-2 (Intercoating paint available from Nippon Paint Co., Ltd.). The intercoated panel was then base-coated with a solvent-borne metallic base paint (Super Lack M-90 available from Nippon Paint Co., Ltd.) and then further coated with the above obtained clear coating composition in the form of wet-on-wet. The clear coated panel was baked at 140° C. for 30 minutes to obtain a cured film having a thickness of 40 μm.

The solvent-borne metallic base paint comprises 10.9 parts of aluminium pigment paste having an aluminium flake content of 65% ("Alpaste 7160N" available from Toyo Aluminium K. K.), 66.85 parts of thermocurable acrylic resin varnish having a solid content of 48% ("Almatex NT-U-448" available from Mitsui Toatsu Kagaku K. K.), 13.37 parts of melamine resin varnish having a solid content of 60% ("Uban 20N-60" available from Mitsui Toatsu Kagaku K. K.), 6.38 parts of toluene, 2.0 parts of butanol and 0.5 parts of trimethylamine.

On the other hand, the phosphated steel panel was coated with Power Top U-30 (Electrodeposition paint available from Nippon Paint Co., Ltd.) and Orga P-2 (intercoating paint available from Nippon Paint Co., Ltd.). The intercoated panel was then base-coated with a water-borne metallic base paint (The paint is described in Example 1 of U.S. Pat. No. 5,183,504.) after drying at 60° C. for 5 minutes and then further coated with the above obtained clear coating composition In the form of wet-on-wet. The clear coated panel was baked at 140° C. for 30 minutes to obtain a cured film having a thickness of 40 μm.

The water-borne metallic base paint comprises 15 parts of aluminum pigment paste having an aluminum flake content of 65% ("Alpaste 7160N" available from Toyo Aluminium K. K.), 30 parts of methyled melamine ("Cymel 303" available from Mitsui Toatsu Kagaku K. K.), 2 parts of isostearlc phosphate ("Phosphorex A-180L available from Sakai Kagaku K. K."), 112 parts of acrylic resin varnish prepared in preparative example 1 of the U.S. Pat. No. 5,183,504, having a number average molecular weight of 12000, a hydroxyl value of 70, an acid value of 58 and a solid content of 50%, and 43 parts of urethane emulsion having an acid value of 16.2 and a solid content of 33%.

The resulting cured film was evaluated as follows and the results obtained are shown in Table 6.

Methods for Evaluation (1) Stability of the coating composition (Coating stability): The resulting clear coating composition stood for 1 week at a room temperature. When any translucency and phase separation was not observed by visual inspection, the coating composition was evaluated as "Good".

(2) Pencil hardness: The cured film was evaluated according to JIS K 5400-1979.

(3) Warm water resistance: A cured film was dipped in warm water at 40° C. for 10 days and then its appearance was observed by visual inspection.

(4) Alkali resistance: The cured film was contacted with 0.2 ml of a 0.1N NaOH aqueous solution at 55° C. for 4 hours, and then observed by visual inspection.

(5) Acid resistance: The cured film was contacted with 0.2 ml of a 0.1 N $H_2SO_4$ aqueous solution at 60° C. for 2 hours and then observed by visual inspection according to the following criteria.
No change ⊙
Slightly changed ○
Definitely changed Δ

(6) Mar resistance: One gram of a 50% cleanser water solution (available from Kao Corp. as New Homing Cleanser containing 87% by weight of abrasive particles, 5% by weight of surfactant and the others) was coated on a flannel fabric (2×2 cm) and attached to a color fastness tester (available from Dale1Kagaku Seiki K. K.). The cured film was rubbed with the fabric going back and forth 10 times at a load of 500 g, and then 20° G gloss was measured by a gloss meter (available from Suga Shikenki K. K.) before and after rubbing, and its change was expressed by percentage.

The percentage is generally related to eye evaluation according to the following criteria.
>90 No change
80 to 90 Slight change but hardly to recognize
70 to 80 Recognizable change
70>Definite change (7) Sealer cracking resistance: The phosphated steel panel was coated with Power Top U-30 (electro-deposition paint available from Nippon Paint Co., Ltd.). The steel panel was then coated with a sealer for automobiles in 5 mm thick, 10 mm width and 150 mm length, and further coated with an intercoating composition ("Orga P-2" available from Nippon Paint Co.. Ltd.) in the form of wet-on-wet. The coated panel was baked at 140° C. for 30 minutes to obtain a sealed and intercoated steel panel. The panel was then base-coated with a solvent type metallic base paint (Super Lack M-90 available from Nippon Paint Co., Ltd.) and then further coated with the present coating composition in the form of wet-on-wet. The coated panel was baked at 140° C. for 30 minutes to obtain a cured film having a thickness of 40 μm. The resulting panel was visually checked whether crack were present on the surface of the panel or not, and evaluated under the following criteria.
No cracking ○
Slight cracking Δ
Large cracking x Examples 2 to 10

Clear coating compositions were prepared as generally described in Example 1, except using the compositions tabulated in the following Table 5, and the same evaluations as Example 1 were conducted. The results were shown in Table 6.

Comparative Example

A comparative clear coating composition was prepared as generally described in Example 1, except using the composition tabulated in the following Table 5, and the same evaluations as Example 1 were conducted. The results were shown in Table 6.

TABLE 5

| Example No. | Polymer (a) | Polymer (b) | Curing catalysts | | | |
|---|---|---|---|---|---|---|
| 1 | A-I (PEx. 15) 205 | B-I (PEx. 22) 320 | TBABr*1 2.2 | | T900*2 6.4 | LS292*3 3.2 |
| 2 | A-II (PEx. 16) 230 | B-I (PEx. 22) 390 | TBABr 2.6 | | T900 7.4 | LS292 3.7 |
| 3 | A-III (PEx. 17) 240 | B-I (PEx. 22) 470 | TBABr 2.1 | Sn5013*4 0.9 | T900 8.5 | LS292 4.2 |
| 4 | A-IV (PEx. 18) 210 | B-I (PEx. 22) 240 | TBABr 1.3 | Sn5013 0.5 | T900 5.4 | LS292 2.7 |
| 5 | A-V (PEx. 19) 205 | B-II (PEx. 23) 140 | TBABr 1.1 | Sn5013 0.4 | T900 4.0 | LS292 2.0 |
| 6 | A-VI (PEx. 20) 230 | B-II (PEx. 23) 230 | TBABr 1.4 | Scat28*5 1.4 | T900 5.4 | LS292 2.7 |
| 7 | A-VII (PEx. 21) 210 | B-II (PEx. 23) 250 | TBABr 1.4 | Scat28 1.4 | T900 5.4 | LS292 2.7 |
| 8 | A-I (PEx. 15) | B-III (PEx. 24) | TBASA*6 1.4 | Scat28 0.9 | T900 3.7 | LS292 1.9 |

TABLE 5-continued

| Example No. | Polymer (a) | Polymer (b) | Curing catalysts | | | |
|---|---|---|---|---|---|---|
| 9 | 205<br>A-IV<br>(PEx. 18) | 120<br>B-III<br>(PEx. 24) | TBASA<br>3.3 | Scat28<br>0.9 | T900<br>3.7 | LS292<br>1.9 |
| 10 | 205<br>A-IV<br>(PEx. 18) | 110<br>B-III<br>(PEx. 24) | TBASA<br>1.3 | Scat28<br>0.9 | T900<br>3.7 | LS292<br>1.9 |
| Comparative example | 205<br>A-VIII<br>(PEx. 18)<br>200 | 110<br>B-II<br>(PEx. 23)<br>200 | TBABr<br>1.6 | | T900<br>5.5 | LS292<br>2.8 |

*1 Tetrabutylammonium bromide
*2 "Tinubin 900" available from Ciba Geigy A.G.
*3 "Sanol LS 292" available from Sankyo Co., Ltd.
*4 Dibutyl tin bis(dodecyl benzene sulfonate) available from Sankyo Yuki Gosei K.K.
*5 Dibutyl tin bis(butyl maleate) available from Sankyo Yuki Gosei K.K.
*6 Tetrabutylammonium salicylate

TABLE 6

| Example | Coating stability | Pencil hardness | Warm water resist. | Alkali resist. | Acid resist. | Mar resist. | Cracking resist. |
|---|---|---|---|---|---|---|---|
| 1 | Good | H | Good | Good | ⊙ | 87 | ○ |
| 2 | Good | F | Good | Good | ⊙ | 84 | ○ |
| 3 | Good | H | Good | Good | ⊙ | 93 | ○ |
| 4 | Good | F | Good | Good | ○ | 89 | ○ |
| 5 | Good | F | Good | Good | ○ | 88 | ○ |
| 6 | Good | H | Good | Good | ⊙ | 82 | ○ |
| 7 | Good | H | Good | Good | ⊙ | 92 | ○ |
| 8 | Good | H | Good | Good | ○ | 86 | ○ |
| 9 | Good | F | Good | Good | ⊙ | 89 | ○ |
| 10 | Good | F | Good | Good | ⊙ | 88 | ○ |
| C. Ex. | Good | H | Good | Good | ○ | 58 | X |

Table 6 shows that the coating compositions of examples 1 to 10 achieve a clear cured film having excellent acid resistance under high temperature, mar resistance and sealer cracking resistance, compared to those of the comparative example.

What is claimed is:

1. A process for forming a cured film on a substrate comprising:

priming or intercoating the substrate;

applying a water-borne or solvent-borne color base paint to a primed or intercoated surface of the substrate;

applying a clear coating composition to a base coated surface of the substrate without curing a base coating layer; and baking both the base coating layer and the clear coating layer to cure;

an improvement being present in that the clear coating composition comprises: (a) 20 to 80% by weight of a polymer having carboxyl and carboxylate groups prepared by half-esterifying (1) a polymer having carboxyl and anhydride groups prepared by copolymerizing (i) 5 to 90% by weight of a carboxyl group-containing ethylenically unsaturated monomer prepared by half-esterifying a hydroxyl group-containing ethylenically unsaturated monomer with an anhydride group-containing compound in an molar ratio of the hydroxyl group to the anhydride group of $1/1.0$ to $1/0.5$, (ii) 10 to 40% by weight of an anhydride group-containing ethylenically unsaturated monomer and (iii) 0 to 85% by weight of a copolymerizable ethylenically unsaturated monomer which is different from (i) and (ii), with (2) a monoalcohol having 1 to 12 carbon atoms; and (b) 20 to 80% by weight of a polymer having hydroxyl and epoxy groups prepared by copolymerizing (1) 5 to 60% by weight of a hydroxyl group-containing ethylenically unsaturated monomer, (2) 10 to 60% by weight of an epoxy group-containing ethylenically unsaturated monomer and (3) 0 to 85% by weight of a copolymerizable ethylenically unsaturated monomer which is different from (1) and (2).

2. The process according to claim 1, wherein the coating composition comprises a quaternary ammonium salt as a catalyst.

3. The process according to claim 1, wherein the coating composition comprises an organic tin compound as a catalyst.

* * * * *